United States Patent [19]

Klüsters

[11] Patent Number: 4,758,445

[45] Date of Patent: Jul. 19, 1988

[54] PROCESS FOR THE PRODUCTION OF ISOHUMULONES

[75] Inventor: Paul Klüsters, Pfaffenhofen a.d. Ilm, Fed. Rep. of Germany

[73] Assignee: Hopstabil Hopfenverarbeitungs-Gesellschaft mbH, Wolnzach, Fed. Rep. of Germany

[21] Appl. No.: 845,179

[22] Filed: Mar. 27, 1986

[30] Foreign Application Priority Data

Apr. 12, 1985 [DE] Fed. Rep. of Germany ....... 3513169

[51] Int. Cl.$^4$ .............................................. C12C 3/00
[52] U.S. Cl. ..................................... 426/600; 426/429
[58] Field of Search ............... 426/425, 429, 592, 651, 426/655, 592, 16, 600; 568/366, 377, 341

[56] References Cited

U.S. PATENT DOCUMENTS

| | | | |
|---|---|---|---|
| 3,298,835 | 1/1967 | Hildebrand et al. | 426/429 |
| 3,433,642 | 3/1969 | Nakayama et al. | 426/425 |
| 3,451,821 | 6/1969 | Todd et al. | 426/429 |
| 3,607,298 | 9/1971 | Mitchell | 426/429 |
| 3,765,903 | 10/1973 | Clarke et al. | 426/600 |
| 4,160,787 | 7/1979 | Moll et al. | 568/341 |
| 4,342,791 | 8/1982 | Baker | 426/651 |
| 4,590,296 | 5/1986 | Cowles et al. | 426/600 |
| 4,666,731 | 5/1987 | Todd | 426/429 |

Primary Examiner—Donald E. Czaja
Assistant Examiner—Carolyn Paden
Attorney, Agent, or Firm—Webb, Burden, Ziesenheim & Webb

[57] ABSTRACT

A process for the production of isohumulones from a hop extract is described in which the hop extract is mixed in a ratio of 1:2 to 1:50 with aqueous solution by stirring at elevated temperature to obtain a two-phase system, the aqueous phase is separated and the humulones are precipitated therefrom by addition of an alkaline earth metal salt; thereafter isomerization of the alkaline earth humulates to the corresponding alkaline earth isohumulates and if necessary conversion of the later to the free isohumulones is carried out. The free isohumulones thus obtained are used to impart a bitter flavor to beer or worts.

20 Claims, No Drawings

PROCESS FOR THE PRODUCTION OF ISOHUMULONES

The invention relates to a process for the production of isohumulones (iso-alpha-acids) from a hop extract obtained by extracting hops with supercritical $CO_2$; separating the humulones from the said mixture and subsequently isomerizing the humulones as the alkaline earth metal-humulates as well as the use of these isohumulones.

The bitter substances of hops which are mainly responsible for giving beer its required bitter flavor are two types of bitter acids, the alpha-acids (humulones) and the beta-acids (lupulones) as well as isohumulones (iso-alpha-acids) which are formed from the humulones by isomerization. The alpha acids are very bitter substances; in contrast the beta-acids only attain a bitter effect after oxidation to the soft resin level or on oxidative degradation.

Humulone-containing bitter substances found in hops and having the following composition are to be understood as falling under the heading "humulones":

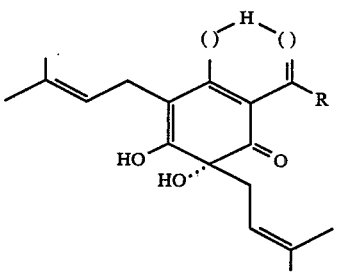

R = $CH_2CH(CH_3)_2$: humulone
R = $CH(CH_3)$: cohumulone
R = $CH(CH_3)CH_2CH_3$: adhumulone
R = $CH_2CH_2CH(CH_3)_2$: prehumulone
R = $CH_2CH_3$: posthumulone On warming, e.g. on boiling hops, the humulones listed above undergo isomerization to the so-called iso-alpha-acids, e.g. cis- and trans-isohumulone which have the formulas given below:

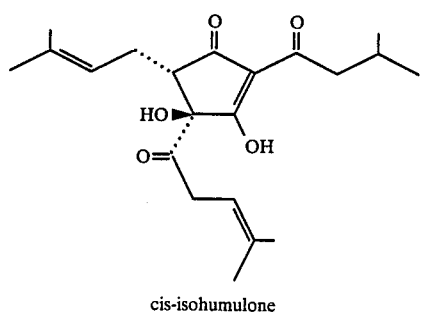

cis-isohumulone

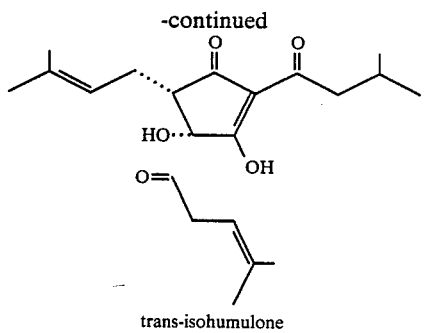

trans-isohumulone

Further isomerization products are the cis- and trans-allo-isohumulones, abeo-isohumulones (oxidized isohumulones), anti-isohumulones, spiro-isohumulones, humelic acids and various homologues as described by M. Verzele: The Chemistry of Hops in "Brewing Science", published by J.R.A. Pollock, Academic Press, London-New York, 1981, pp. 279-332.

It has been established that on brewing beer only some 30% of the humulones are converted into the required isohumulones; 70% of the humulones are degraded by side reaction or absorbed. In order to maintain a maximal proportion of the valuable isohumulones various processes have been developed in which the humulones are isomerized to isohumulones to start with and are then added to the beer at a relatively late production phase. Such developments constituted two basic approaches:

(a) isomerization first, then separation; or
(b) separation first, then isomerization.

In process variant (a) the hop extract, which contains humulones, lupulones, hop oils, lipids and waxes as well as hard resins, is refluxed in an alkaline medium at approximately pH 12. In this way isomerization of the humulones to isohumulates, i.e. potassium and/or sodium isohumulates is achieved. In this alkaline refluxing process the potassium-sodium salts of the hard resins are also obtained.

By reducing the pH value of the thus obtained isohumulate/lupulate mixture to approximately 9.0 the lupulate is precipitated, while the potassium/sodium isohumulate remains in aqueous solution as a salt at this pH. The precipitated lupulates are added to the brewing process while the potassium/sodium isohumulates are left in aqueous solution and added to the finished beer before the filtration process.

In a further variation of the above separation of the components after heating of the extract in alkaline medium can be effected by a two-phase separation between hexane and water, the pH being adjusted to 7.0 by addition of acid for the separation. In this way free isohumulones are obtained in the aqueous phase while the lupulones are dissolved in the hexane. The lupulones are isolated on evaporation of hexane. It is generally not possible to quantitatively remove the hexane, and this constitutes a disadvantage of this process. Further disadvantage of the two-phase separation process is that the hard resins are also extracted into the aqueous phase as well as the isohumulones and thus also get added to the beer. The presence of hard resins in the beer is not required as they have an unpleasantly bitter taste.

Process variant (b) is based on a separation of the humulones from the lupulones. This is effected by a two-phase separation between hexane and aqueous methanol in which the humulones are extracted into the hexane and the lupulones into the aqueous methanol. The separation is preferentially carried out at pH of around 5.

According to another variant of the above the separation is effected by means of polypropylene pellets which are closely packed and offer a large surface area. The total extract becomes bound to the synthetic granules. The granules plus bound resins are then washed with an aqueous alkaline solution whereby the humulones are absorbed into the aqueous solution while the lupulones remain bound to the synthetic granules.

After the separation of the humulones according to process variant (b) has been carried out, isomerization can subsequently be effected if required. The following isomerization reactions are available:

The humulones may be isomerized to the corresponding potassium/sodium isohumulates by boiling in alkaline solution. This process is accompanied by the formation of numerous specific side products.

The isomerization can also be carried out by treating the alkaline earth metal-humulate at elevated temperatures. By the addition of magnesium or calcium salts to the potassium/sodium humulates the insoluble magnesium/calcium humulates are obtained which precipitate from the aqueous solution. The magnesium/calcium humulates separated in this way are then subjected to an isomerization reaction at a temperature of approximately 105° C. This procedure leads to the purest isohumulates since unwanted side reaction are less evident in this procedure. Because of the poor solubility of magnesium isohumulates this is preferably treated with sodium polyphosphate as solubilizer which leads to the formation of sodium isohumulate.

Although only small quantities of unwanted by-products are formed during process variant (b) a disadvantage of the process is the incomplete removal of hexane after humulone separation which leads to unwanted contamination of the beer. This problem does not occur on use of polypropylene granules for the separation of humulones but this process is further complicated by the need for further treatment of the granules with methanol/water after desorption of the humulones in order to isolate the lupulones and hop oils which are still absorbed on the granules.

An object of the present invention is to provide a process in which the disadvantages of the known processes are avoided and particularly to provide a process in which a high yield of isohumulones is obtained without unwanted side reactions occurring, in which the use of organic solvents or other solubilizers is not necessary and in which the use of synthetic substances is avoided.

This object is achieved by means of the process described in the opening paragraph which is characterized by the following process steps:

(a) mixing the hop extract with aqueous solution in a ratio of 1:2 to 1:50, preferably 1:2 to 1:20 by stirring at elevated temperature to obtain a two-phase system in which the quasi-oily phase contains dissolved hop oils, lupulones, undissolved humulones, fats and waxes and in which the quasi-aqueous phase contains the dissolved humulones, (b) separation of the aqueous phase, (c) precipitation and separation of the humulones from the aqueous phase by addition of an alkaline earth metal salt, (d) recycling the filtrate obtained in step (c) into a new separation step if necessary, (e) isomerization of the alkaline earth metal humulates obtained as a thin layer of pasty consistency to the corresponding alkaline earth metal-isohumulates by subjecting it to elevated temperature and a humidity of 90 to 98% for a period of 5 min. to 6 hours, and (f) if necessary, conversion of the alkaline earth metal-isohumulates to the corresponding free isohumulones.

In the process according to the invention it is preferable to use a hop extract obtained with $CO_2$, preferably supercritical $CO_2$ as starting material. It is known that such resins are largely free of hard resins. In this way problems related to so-called "gushing" problem are avoided. In principle, however, any preferred hop extracts can be used as starting material for the process according to the invention, although it is preferred to separate hard resins from the aqueous isohumulate phase. In the process according to the invention separation of the humulones is achieved from the hop extract. By mixing the hop extracts with aqueous solution in a ratio of 1:2 to 1:50, preferably 1:2 to 1:20 and particularly preferred 1:3 to 1:6, a two-phase mixture is obtained in which a quasi-oily phase contains hop oils, lupulones, insoluble humulones, lipids and waxes while the quasi-aqueous phase contains the dissolved humulones.

The quasi-oily phase mentioned above is generally the upper layer although it can, exceptionally, occur as the lower layer. The quasi-aqueous phase is generally the lower phase.

Mixing of the hop extract with aqueous solution is preferably carried out in such a manner that the hop extract is covered with the appropriate quantity of water and heated in a vessel which may be attached to a thermostat. The hop oils then rise to the surface. The vessel is preferably equipped with a stirring device with which the extract/water mixture can be stirred. Stirring the extract/water mixture forms an emulsion and the viscosity of the resin extract is sharply reduced to a level similar to that of water. The size of the droplets in the emulsion is less than 1 mm. After switching off the stirrer the emulsion is left to stand for some time whereupon separation into two phases occurs. During the stirring procedure the bulk of the humulones are taken into the aqueous phase as alkaline humulates. After leaving the emulsion to stand a layer comprising lupulones, undissolved humulone, resinous oils, etc. and which constitute approximately 1/5 of the total height of the mixture forms above the aqueous alkali humulate solution.

The aqueous solution used in step (a) is an aqueous solution which contains alkali ions and is adjusted to an alkaline pH.

In the two-phase separation according to step (a) it is preferred to use an aqueous solution having a pH of approximately 9. The pH is adjusted by the addition of alkaline salts, e.g. $K_2CO_3$, $Na_2CO_3$, KOH, or NaOH. The addition of $K_2CO_3$ is particularly preferred.

It is preferable that the aqueous solution used in step (a) has an elevated concentration of alkaline ions. For this reason potassium acetate is added to the water used alongside the alkaline salt, preferably $K_2CO_3$.

The two-phase separation according to step (a) is carried out at elevated temperature, preferably at a temperature of 30° to 80° C., and most preferably at a temperature of 30° to 35° C.

In the two-phase separation according to step (a) the aqueous/oily mixture is preferably stirred at a rate of 1000 rpm. Any type of stirrer may be used for this purpose, but a propeller stirrer is preferred. Stirring is carried out for a period of 3 to 30 min., preferably for 5 min.

After the stirring operation has been completed, the stirrer is switched off and the mixture is left to separate for approximately 15 min. Thereafter the aqueous phase is separated. The humulones are precipitated from the aqueous phase by the addition of an alkaline earth metal salt. Precipitation may be effected by means of the magnesium or calcium salt. The addition of magnesium salts is preferred, particularly $MgCl_2$.

To maximize the yield of the humulones required the filtrate obtained after collection of the alkaline earth metal humulones is recycled for further separation. A preferred method is to adjust the pH of the filtrates to 8.5 by addition of $K_2CO_3$ and to add the oily phase obtained from step (a) to it. Once again a ratio of hop extracts to aqueous solution of approximately 1:3 to 1:6 is preferred; a ratio of 1:4 being particularly preferred.

This recyclization step is repeated several times, preferably three times. In the following the recycling steps are denoted 2 to 4. A maximum yield of the humulones from the recycling steps 2 to 4 is achieved by particular adjustment of the pH value, the temperature and stirring time.

In the recycling stages the pH value is preferably adjusted as shown in the following table, i.e. to a value of 8.5, 8.0 and 7.5.

The stirring time is also adjusted according to the recycling step as shown in the following table, i.e. it is varied from 5 min. to 30 min. The temperature in these recycling steps is varied between 55° and 50° C.

The pH, stirring and temperature conditions given are designed to avoid dissolution of lupulones but at the same time to achieve a sufficient solubility of the humulones. The four-stage process is summarized in the following table.

TABLE

| Stage | pH Value | Stirring Time (Reaction Time) | Settling Period (Time before separation of K-humulate) | Temperature (°C.) | Residual Humulone Content (%) |
| --- | --- | --- | --- | --- | --- |
| 1 (separation stage) | 9,0 | 5 min. | 15 min. | 60 | appox. 28 |
| 2 (1st recyclization) | 8.5 | 5 min. | 15 min. | 55 | 16 |
| 3 (2nd recyclization) | 8,0 | 30 min. | 15 min. | 50 | 6 |
| 4 (3rd recyclization) | 7.5 | 30 min. | 15 min. | 50 | less than 1 |

As can clearly be seen from the above table, humulones can be practically quantitatively separated from the hop extract by means of the process according to the invention. Residual humulone content after carrying out the third recycling step is less than 1%.

The alkaline earth metal humulates, preferably magnesium humulate precipitated with alkaline earth metal salts, must subsequently be submitted to an isomerization reaction. This isomerization reaction may for example be carried out in the following way:

The alkaline earth metal humulates, preferably magnesium humulates are subjected to temperature treatment as a mass of pasty or highly viscous consistency at a temperature of approximately 105° C. For this procedure it is advantageous to spread the pasty mass of the magnesium humulates as a thin layer on a suitable plate or sheet preferably a highly corrosion resistant steel sheet. A relatively high atmospheric humidity is required for the temperature treatment. A humidity of 90 to 98% is preferred; a humidity of 95% is particularly preferred.

Temperature treatment is carried out over a period of from 1 to 6 hours. In general it is sufficient to treat the magnesium humulates for 2 hours at the given temperature and a humidity of 95% water. The magnesium isohumulates obtained by this temperature treatment constitutes a product which is ready for use.

According to a further embodiment of the invention the isomerization reaction may occur on microwave irradiation. Until now research into the use of microwaves for the induction of an isomerization reaction has only been carried out in rare cases. It is of importance that no unwanted isomerizations of the components of a meal occurs during cooking with microwaves. Thus according to an investigation by Mai J., Tsai C. H., Armbruster G., Chu. P. and Kinsella J. E. published in J. Food Sci. 45 (6) 1980, pp. 1753-1755, unsaturated fatty acids do not undergo isomerization on subjection to microwaves.

It was therefore all the more surprising for the Applicant to establish that alkaline earth metal humulates undergo isomerization to the corresponding isohumulates in an astonishingly short time on treatment with microwaves.

In this procedure it is preferred that the humulates are spread as a moist pasty mass with a thickness of 0.1 to 2 cm on a sheet etc. The humidity of the pasty mass should be 90 to 98%, preferably 95% humid.

The process was carried out with a normal trade microwave oven for domestic use with an output of 800 Watts. The irradiation time was 2 to 15 min. whereby essentially quantitative isomerization to the isohumulates could already be established after 5 min. The temperature of the pasty mass during the procedure was between 95° and 110° C., preferably around 100° C.

The embodiment of the isomerization reaction involving microwave irradiation described above leads to a substantial simplification and qualitative improvement of the process according to the invention.

Since the solubility of magnesium isohumulates is relatively poor the following is concerned with the removal of magnesium from the isohumulate and the formation of the free isohumulone acids.

According to the invention this process stage is carried out as follows:

First of all an approximately 10% solution of magnesium isohumulate alcohol, preferably ethanol, is prepared and then acidified to a pH of approximately 2 to 6, particularly suitable for the acidification are oxalic acid, mineral acid or $CO_2$. The free isohumulone acids are formed on this acidification. Removal of the salts present in the mixture is achieved by reverse osmosis leaving isohumulone with a certain residual ethanol content. Ethanol+salts+excess acids are separated from the required mixture.

In this way an approximately 60% isohumulone end product is obtained. Particularly suitable as a sales product is an approximately 30% isohumulone, the balance comprising ethanol.

In order to secure the bacteriostatic effect and biological stability of the free isohumulones they are preferably stored and sold as 10 to 20% ethanolic solutions.

According to a further variant it is also possible to effect conversion of the alkaline earth metal isohumulates, preferably magnesium isohumulate to the corresponding free isohumulones according to step (f) either by means of reverse osmosis or by means of a strong acid cation exchange resin. For this purpose the isohumulates obtained in step (e) are dissolved in alcohol and either passed through a suitable macroporous strong acid ion exchange resin column or brought into contact with a sufficient quantity of cation exchange resin.

Until now the humulates were added to the unfiltered or filtered beer as their alkaline salts. For this purpose the isohumulone content must be diluted to 0.5 to 1%. The pH value of this aqueous solution is adjusted to the alkaline region of 8 to 9. During this pH adjustment numerous unwanted side effects occur, e.g. tendency to severe clouding of the beer, development of off-flavors and gushing.

In order to avoid these unwanted side effects and achieve a high quality of the beer bitters by means of an increased yield of the alpha-isohumulones to be added addition of the free isohumulones to beer as well as to worts is provided for. As such the isohumulones can be added in high concentration thus avoiding the need for major dilution of the beer or the worts. Of particular significance is that the addition of the free isohumulones produced according to the invention no use of chemicals not naturally occurring in beer is necessary. Any solubilizers used are natural substances. Particular examples of these are ethanol, glucose, isoglucose, fructose, corn syrup solids, dextrin, or mixtures thereof. Depending on the solubilizer or carrier substance used, the isohumulone-containing product may be mobile to highly viscous. The pH range of the isohumulone-containing product to be added is on the acid side, preferably pH 3 to 6 and particularly preferably about pH 4.

According to the invention the free isohumulones are added to the beer or worts in a highly concentrated form by being solubilized by a suitable solubilizer. The concentration of such an addition mixture is at least 10% isohumulone based on solubilizer. In general it is preferred that the isohumulones are present in a concentration of 10 to 30% and above. It is preferred that the isohumulone together with the solubilizer, e.g. as an ethanolic solution is added in a constant stream to the beer during pumping circulation. Despite the relatively low solubility of the iso-alpha-acids in beer (circa 60 to 80 mg/l) no precipitation thereof occurs during said addition. All iso-alpha-acids added in this manner are retained in the beer after filtration.

According to another embodiment an isohumulone/-glucose syrup mixture preferably of 10% isohumulone concentration is either introduced to a storage tank or added to the wort. Dosing of the iso-alpha-acid/glucose mixture to the hot wort is particularly suitable since an improvement in the yield of isohumulone in comparison to conventional hopping is achievable in this way. The addition is preferably effected 5 to 10 min. before boiling is terminated.

According to a further embodiment, the highly viscous mixture of isohumulones and glucose (10% / 90%) may be placed on a metal sieve which may be placed in the vapours above the brewing pan shortly before boiling is terminated. In this way the said mixture becomes mobile and drops into the wort in which it immediately dissolves.

The following examples describe the invention in more detail although they should not be regarded as limiting the scope of the invention.

EXAMPLE 1

5 kg of a resin obtained by extraction with supercritical $CO_2$ was covered with 20 l of aqueous $K_2CO_3$ solution to obtain a preferred ratio of 1:4 and heated to a temperature of 60° C. in a vessel attached to a thermostat in a pilot plant. The hop oil then floated to the surface. The vessel was equipped with a stirring device and the components which had been heated to 60° C. were stirred for 5 min. A propeller stirrer with a stirrer speed of 1000 rpm was used for this purpose. An emulsion formed, whereupon the viscosity of the resin extract was sharply reduced to one corresponding approximately to water. The droplet size amounted to less than 1 mm.

After switching off the stirrer device the mixture was left to stand at 60° C. for 15 min. During the stirring process a considerable portion of the humulone went into the aqueous phase as humulate.

By means of the treatment above the humulones were converted to potassium humulates. On standing a layer comprising lupulone, undissolved humulone and resin oil having approximately 1/5 of the total height of the vessel contents formed above the aqueous potassium humulate solution.

After standing for 15 min. the lower aqueous phase containing the potassium humulate was drained from the vessel and the potassium humulate was precipitated as magnesium humulate from the aqueous phase by precipitation with $MgCl_2$. The magnesium humulate obtained in this way was collected by filtration.

The filtrate obtained from the above filtration was adjusted to pH 8.5 by the addition of $K_2CO_3$ and recycled into step (a) of the process as described previously.

The magnesium humulate which was precipitated with $MgCl_2$ was submitted to the following isomerization reaction. The magnesium humulate was spread as a thin, circa 2 cm thick filter cake on a V2A plate and treated at a temperature of approximately 105° C. at a relative humidity of over 95% $H_2O$ for circa 2 hrs. In this way conversion to a magnesium isohumulate was achieved. This constitutes a saleable product. Because of the poor solubility of magnesium isohumulate it is preferred to produce the free isohumulone acid. To achieve this a 10% solution of magnesium isohumulate in ethanol was prepared and adjusted to pH 4 by means of oxalic acid. The solution was subsequently separated into isohumulone with a certain residual ethanol content and ethanol plus acid by means of reverse osmosis. In this way an end product containing approximately 60% of isohumulone was obtained.

EXAMPLE 2

According to a further alternative the magnesium isohumulate was converted into the free isohumulone by means of a macroporous strong acid cation exchange resin. The exchange resin Levatit produced by Bayer Company, Leverkusen was used for this purpose. The resin was placed in four columns connected in series and each having a diameter of 15 cm and a height of approximately 80 cm. An approximately 10% ethanolic solution of magnesium isohumulate was passed through the columns in a continual process. In this process the magnesium ion becomes fixed to the exchange resin while the free isohumulone passes through the column.

As soon as the first column in the series became saturated with magnesium ions during the continual process, which was indicated by the corresponding conductivity value this column was replaced and a new column added to the end of the series. In the meantime the first column which had been removed was regenerated. The above process can treat at least 100 l of methanolic solution an hour. Ethanol was evaporated from the isohumulone solution obtained until the concentrate constituted an approximately 30% ethanolic solution of isohumulone.

I claim:

1. Process for the production of isohumulates from a hop extract obtained by extracting hops with $CO_2$ by separating the humulones from said extract and subsequently isomerizing the humulones as the alkaline earth metal humulates characterized by the following process steps:
   (a) Mixing the hop extract in a ratio of 1:3 to 1:20 with an aqueous solution by stirring at an elevated temperature to obtain a two-phase system wherein an oily phase contains the dissolved hop oils, lupulones, undissolved humulones, fats and waxes and an aqueous phase contains the dissolved humulones,
   (b) Separating said aqueous phase from said oily phase,
   (c) Precipitating and separating the humulones from the aqueous phase by addition of an alkaline earth salt, to yield a thin layer of the alkaline earth humulates having pasty consistency, and
   (d) Isomerizing said thin layer of the alkaline earth humulates having pasty consistency to the corresponding alkaline earth isohumulates at a temperature of from 95° to 110° C. and a humidity of 90 to 98% for a time period of 5 min. to 6 hrs., by exposing the same to microwave irradiation.

2. Process according to claim 1 characterized in that the ratio of hop extract : aqueous solution in step (a) is 1:3 to 1:6, preferably 1:4.

3. Process according to claim 2 characterized in that the aqueous solution in step (a) is adjusted to a pH value of approximately 9.

4. Process according to claim 3 characterized in that the pH adjustment is carried out by the addition of an alkaline salt, particularly $K_2CO_3$.

5. Process according to claim 1 characterized in that step (a) is carried ut at a temperature of 30° to 35° C.

6. Process according to claim 5 characterized in that step (a) is carried out at a temperature of 60° C.

7. Process according to claim 6 characterized in that the stirring operation is carried out for a period of 3 to 30 min. and preferably by means of a propeller stirrer.

8. Process according to claim 7 characterized in that the mixture is left to stand for approximately 15 min. after the stirring operation.

9. Process according to claim 1 characterized in that the alkaline earth salt added in step (c) is selected from the group consisting of magnesium salts and calcium salts.

10. Process according to claim 1 wherein step (c) further comprises the step of: (c) Precipitating and separating the humulones from the aqueous phase by addition of an alkaline earth salt to yield a thin layer of the alkaline earth humulates having pasty consistency, and recycling said thin layer in a recycling step by adding it to said oily phase of step (a) for further separation.

11. Process according to claim 10 characterized in that said recycling step is repeated 2 or 3 times.

12. Process according to claim 11 characterized in that said recycling step is repeated three times and the pH value of the filtrate is adjusted to 8.5, 8.0 and 7.5, respectively, for each of the three repetitions.

13. Process according to claim 12 characterized in that the adjustment of the pH value is carried out by the addition of $K_2CO_3$.

14. Process according to claim 11 characterized in that said recycling step is repeated three times with stirring of 5 min., 30 min. and 30 min. respectively, for each of the three repetitions.

15. Process according to claim 11 characterized in that said recycling step is repeated three times with the temperature being 55, 50° and 50° C., respectively, for each of the three repetitions.

16. Process according to claim 15 characterized in that the humulates to be subjected to the isomerization reaction are spread in a thin layer on a highly corrosion resistant steel plate.

17. Process according to claim 1 further comprising the step of: (e) converting said alkaline earth isohumulates to corresponding free isohumulones by making a 10% ethanolic alkaline earth humulate solution and acidifying the same with a compound selected from the group consisting of oxalic acid, HCl and $CO_2$ to pH 4.

18. Process according to claim 17 characterized in that a strong acid cation exchange resin is used to obtain the free isohumulone.

19. Process for the production of isohumulones from a hop extract obtained by extracting hops with $CO_2$ by separating the humulones from said extract and subsequently isomerizing the humulones as the alkaline earth metal humulates characterized by the following process steps:
   (a) Mixing the hop extract in a ratio of 1:3 to 1:20 with an aqueous solution by stirring at an elevated temperature to obtain a two-phase system wherein an oily phase contains the dissolved hop oils, lupulones, undissolved humulones, fats and waxes and an aqueous phase contains the dissolved humulones,
   (b) Separating said aqueous phase from said oily phase,
   (c) Precipitating and separating the humulones from the aqueous phase by addition of an alkaline earth salt, to yield a thin layer of the alkaline earth humulates having pasty consistency,
   (d) Isomerizing said thin layer of the alkaline earth humulates having pasty consistency to the corresponding alkaline earth isohumulates at a temperature of from 95° to 110° C. and a humidity of 90 to 98% for a time period of 5 min. to 6 hrs., by exposing the same to microwave irradiation, (e) Converting the alkaline earth isohumulates to the corresponding free isohumulones, and (f) Adding said free isohumulones, to beer or worts, in an amount effective to impart bitterness thereto.

20. Process according to claim 19 wherein step (f) further comprises the step of: (f) Adding said free isohumulones, to beer or worts, in an amount effective to impart bitterness thereto, with the addition being accompanied by the addition of one or more solubilizers, selected from the group consisting of ethanol, glucose, isoglucose, fructose, corn syrup solids, and dextrin, in an amount effective to enhance the solubility of said free isohumulones.

* * * * *